United States Patent [19]

Okuda et al.

[11] 4,280,461
[45] Jul. 28, 1981

[54] CONTACTLESS IGNITION SYSTEM FOR INTERNAL COMBUSTION ENGINES

[75] Inventors: Ryoichi Okuda, Kariya; Tomoatsu Makino, Okazaki; Katsuteru Miwa, Kariya, all of Japan

[73] Assignee: Nippondenso Co., Ltd., Kariya, Japan

[21] Appl. No.: 82,755

[22] Filed: Oct. 9, 1979

[30] Foreign Application Priority Data

Oct. 13, 1978 [JP] Japan ............................ 53-126327

[51] Int. Cl.$^3$ .............................................. F02P 5/04
[52] U.S. Cl. .................................... 123/418; 123/414; 123/415; 123/644
[58] Field of Search ............... 123/148 E, 117 R, 414, 123/415, 418

[56] References Cited

U.S. PATENT DOCUMENTS

| 3,447,521 | 6/1969 | Piteo | 123/148 E |
| 3,995,608 | 12/1976 | Suda | 123/148 E |
| 4,111,174 | 9/1978 | Fitzner | 123/148 E |
| 4,112,904 | 9/1978 | Uno | 123/148 E |
| 4,164,926 | 8/1979 | Kindlmann | 123/148 E |

*Primary Examiner*—Ronald B. Cox
*Attorney, Agent, or Firm*—Cushman, Darby & Cushman

[57] ABSTRACT

A contactless ignition system for internal combustion engines controls the closing angle of an engine in response to a signal derived by comparing the AC output of an alternator operated in synchronism with the rotation of the engine with the output of a bias-up circuit adapted to supply a DC bias signal which varies with the speed of the engine. The outputs of the alternator and the bias-up circuit are applied to a voltage comparison circuit and the voltage comparison circuit applies to the bias-up circuit a signal having a frequency which is proportional to the number of revolutions of engine. In response to the signal the bias-up circuit generates a signal proportional to the engine speed and this signal is converted through a non-linear circuit of the bias-up circuit into a DC bias signal whose rate of change is small at low engine speeds but increases with an increase in speed at higher engine speeds.

4 Claims, 4 Drawing Figures

CONTACTLESS IGNITION SYSTEM FOR INTERNAL COMBUSTION ENGINES

FIELD OF THE INVENTION

The present invention relates to a contactless ignition system with a closing angle control unit which is designed for use with internal combustion engines, particularly automobile internal combustion engines.

DESCRIPTION OF THE PRIOR ART

In a known type of contactless ignition system with a closing angle control unit, a voltage comparison circuit receives as its inputs the AC output of an alternator operated in synchronism with the rotation of an engine and the DC output of a bias-up circuit which is proportional to the number of revolutions of the engine so that the flow of primary current in an ignition coil is switched on and off in response to the resulting rectangular wave output of the voltage comparison circuit corresponding to the inputs and the conduction angle of the ignition coil is increased with an increase in the engine rotational speed, while the DC output from the bias-up circuit is decreased by a bias-down circuit during a time width in which a power transistor is subjected to constant-current control by a constant-current control circuit which limits the primary current in the ignition coil to a predetermined value and the conduction angle of the ignition coil is decreased, whereby accomplishing the desired closing angle control.

Figure 1:
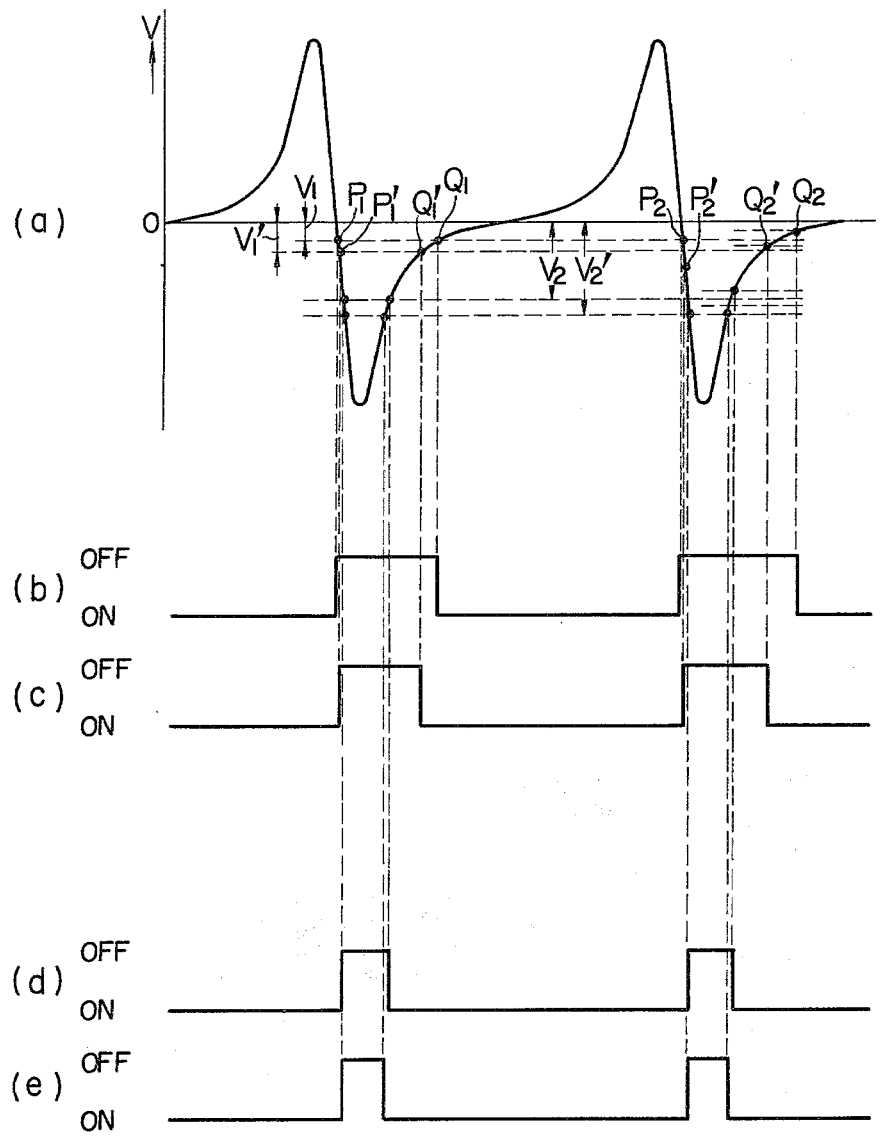
FIG. 1 is a waveform diagram for explaining the operation of a prior art system.
Figure 2:
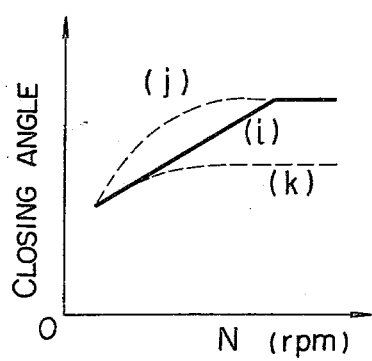
FIG. 2 is a characteristic diagram for explaining the operation of the prior art system.

In this case, the AC output of the alternator operated in synchronism with the rotation of the engine has a waveform as shown in (a) of FIG. 1. When the speed of the engine at a low speed operation increases so that the threshold level changes from $V_1$ to $V_1'$ due to the fact that the DC output of the bias-up circuit is proportional to the engine speed or the number of revolutions of the engine, the power transistor which was previously turned off at a point $P_1$ and turned on at a point $Q_1$ as shown in (b) of FIG. 1, is now turned off at a point $P_1'$ and turned on at a point $Q_1'$ as shown by the waveform shown in (c) of FIG. 1. In consideration of the decrease in the DC output of the bias-up circuit effected by the bias-down circuit, the power transistor which was previously turned off at a point $P_2$ and turned on at a point $Q_2$ as shown in (b) of FIG. 1, is now turned off at a point $P_2'$ and turned on at a point $Q_2'$ as shown in (c) of FIG. 1. In this case, as shown by the waveform in (c) of FIG. 1, the on-duration of the power transistor, the closing angle (the conduction angle of primary current in the ignition coil), is increased relative to the closing angle shown in (b) of FIG. 1. On the other hand, when the threshold level changes from $V_2$ to $V_2'$ at a high speed operation, the power transistor is turned on and off as shown by the waveforms in (d) and (e) of FIG. 1 and the closing angle is increased only slightly. In other words, since the AC output from the alternator has the waveform shown in (a) of FIG. 1, if the DC output from the bias-up circuit is proportional to the engine speed, at the low speed operation the closing angle increases greatly with an increase in the engine speed, while at the high speed operation the closing angle increases only slightly with an increase in the engine speed. Thus, the prior art circuit is disadvantageous in that in an attempt to make the relation between the engine speed and the closing angle conform with the optimum closing angle limit curve (i) shown in FIG. 2, if the closing angles are set so that the optimum closing angle is obtained at high engine speeds, the closing angle will be increased excessively at low engine speeds as shown by the curve (j), while if the closing angles are set so that the optimum closing angle is obtained at low engine speeds, the closing angle will become excessively small at high engine speeds as shown by the curve (k).

SUMMARY OF THE INVENTION

With a view to overcoming the foregoing deficiencies in the prior art, it is a first object of the invention to provide a contactless ignition system for internal combustion engines in which the DC output of a bias-up circuit is changed nonlinearly in such a manner that the change is small when the number of revolutions of the engine is low and the variation is increased with an increase in the number of revolutions of the engine, thus ensuring the desired closing angle control throughout a wide range of engine speeds extending from low to high speeds.

It is a second object of the invention to provide a contactless ignition system in which the DC output of a bias-up circuit is decreased nonlinearly in accordance with the number of revolutions of the engine by a bias-down circuit during a time in which a power transistor is subjected to constant-current control by a constant-current control circuit which limits the primary current in the ignition coil to a value below a predetermined value, whereby the optimum closing angle control is accomplished throughout a wide range of engine speeds extending from low to high speeds and the ignition is effected with a high energy, thus reducing the consumption of power and the generation of heat by the ignition coil and the power transistor and also ensuring a high degree of reliability in operation.

Thus, in accordance with the system of the invention in which the desired closing angle control is accomplished by applying to a voltage comparison circuit the AC output of an alternater operated in synchronism with the engine rotation and the DC output of a bias-up circuit which varies with the engine speed, there is a great advantage that the DC output of the bias-up circuit is increased nonlinearly with an increase in the engine speed with the result that not only the closing angle is prevented from increasing excessively at low engine speeds but also the closing angle is increased with increased rates at high engine speeds, thus ensuring the desired closing angle control throughout a wide range of engine speeds extending from low to high speeds.

Another great advantage is that since the DC output of the bias-up circuit is decreased by a bias-down circuit during a time that a power transistor is controlled by a constant-current control circuit which limits the current flowing in the primary winding of an ignition coil to a predetermined value and the rate of decrease in the DC output is increased nonlinearly with an increase in the engine speed, the closing angle can be controlled to the optimum value throughout a wide range of engine speeds extending from low to high speeds, thus preventing the closing angle from becoming excessively large or small and thereby effecting the ignition with a high energy and high degree of reliability and reducing the power consumption and heat generation of the ignition coil and the power transistor, respectively.

DESCRIPTION OF THE PREFERRED EMBODIMENT

The present invention will now be described in greater detail with reference to the illustrated embodiment.

Figure 3:
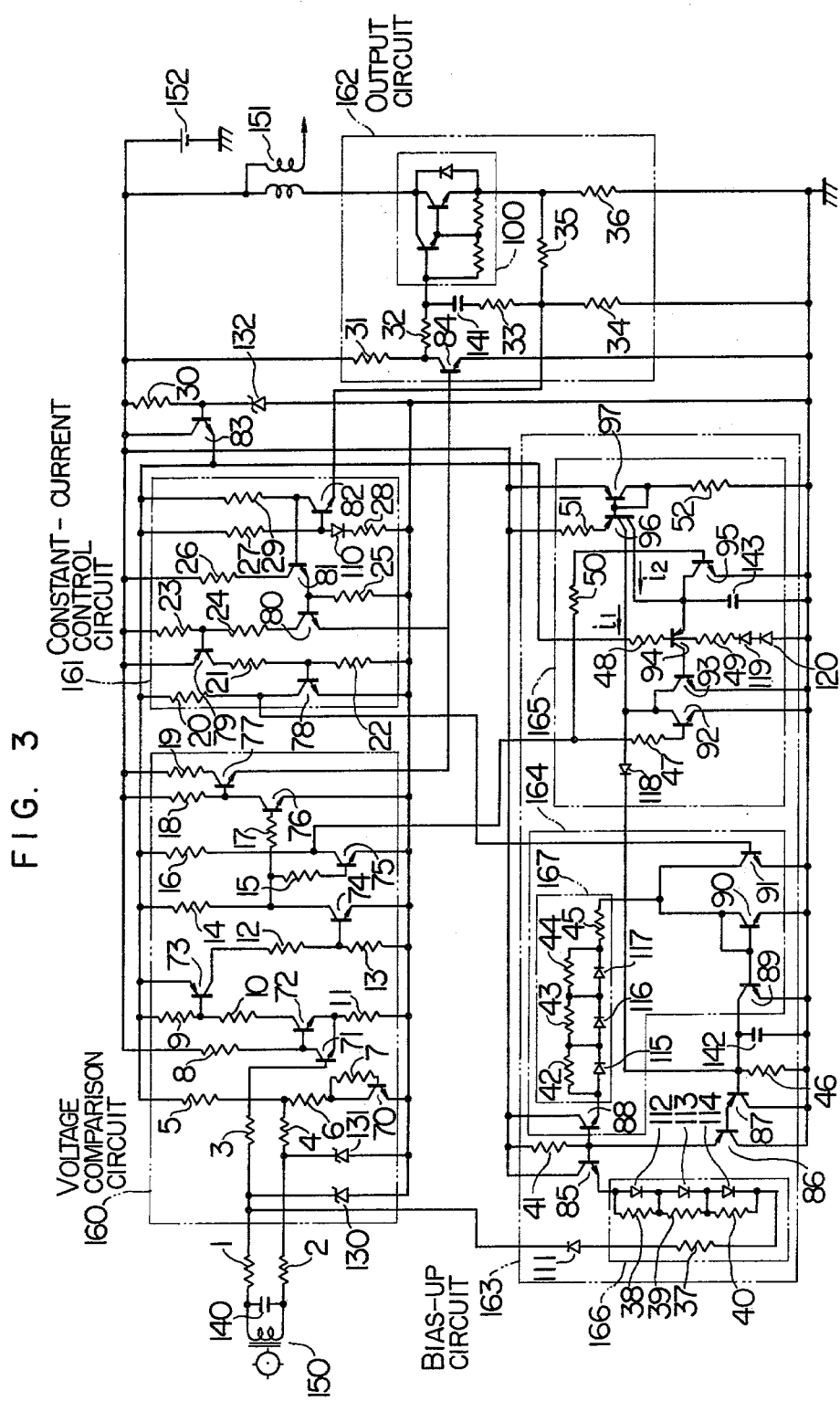
FIG. 3 is a circuit diagram showing an embodiment of a system according to the invention.

Referring to FIG. 3, there is illustrated a circuit diagram for an embodiment of an ignition system according to the invention. In the Figure, numerals 1 to 52 designate resistors, 70 to 97 transistors, 100 a power transistor, 110 to 120 diodes, 130 to 132 Zener diodes, 140 to 143 capacitors, 150 an alternator operated in synchronism with the rotation of an engine, 151 an ignition coil, and 152 a battery. Designated at numeral 160 and enclosed by a chain line is a voltage comparison circuit for generating a rectangular wave according to a threshold level determined by the AC output of the alternator 150 and the DC output of a bias-up circuit 163. Numeral 161 designates a constant-current control circuit for detecting the current in the primary winding of the ignition coil and controlling the same so as to not exceed a predetermined value, and 162 an output circuit responsive to the rectangular wave from the voltage comparison circuit to make and break the primary winding of the ignition coil 151. Numeral 163 designates a bias-up circuit for applying a DC output to the voltage comparison circuit 160 in such a manner that the optimum closing angle control is effected in relation to the engine speed, and 164 a bias-down circuit for decreasing the DC output of the bias-up circuit during the time that the constant-current control is effected. Numeral 165 designates a frequency-to-current converter for determining the DC output of the bias-up circuit 163 in relation to the number of revolutions of the engine, 166 a function circuit for making the DC output of the bias-up circuit 163 nonlinear with respect to the number of revolutions of the engine, and 167 a function circuit whereby the rate at which the DC output of the bias-up circuit 163 is decreased by the bias-down circuit 164 is made nonlinear with respect to the engine speed. The diodes 119 and 120 are used for the purpose of temperature compensating the function circuit 166. The capacitor 141 and the resistor 33 are used for oscillation preventing purposes.

With the construction described above, the basic operation of the embodiment excluding the constant-current control circuit 161 and the bias-up circuit 163 will now be described first. The AC output of the alternator 150 controls the transistor 71 through the input resistors 1 and 3. When the transistor 71 is turned on by the AC output with a positive polarity, the transistors 72, 73 and 74 are turned off, the transistor 76 is turned on, the transistors 77 and 84 are turned off and the power transistor 100 is turned on, thus supplying a current to the primary winding of the ignition coil 151. On the contrary, when the transistor 71 is turned off by the AC output with a negative polarity, the power transistor 100 is turned off through the transistors 72, 73, 74, 76, 77 and 84, so that the current flowing in the primary winding of the ignition coil 151 is cut off and a high voltage is produced in the secondary winding of the ignition coil 151, thus producing an ignition spark at each of the spark plugs through the distributor which is not shown.

Next, the operation of the embodiment including the constant-current control circuit 161 will be described. When the current flowing in the primary winding of the ignition coil 151 is increased, the emitter potential of the transistor 82 increases so that in comparison with the base potential determined by the resistors 27 and 28, when the current in the primary winding exceeds a predetermined value, the transistor 82 starts to change from the conductive state to the cutoff state, the transistors 81 and 80 start to turn on and the transistor 84 starts to turn on, thus decreasing the base potential of the power transistor 100 and thereby limiting the current flowing in the primary winding of the ignition coil 151 to the predetermined value. When the constant-current control is being effected, the transistors 79 and 78 are turned on and the collector potential of the transistor 78 is decreased, thus generating a control signal.

Figure 4:
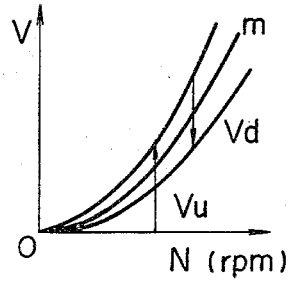
FIG. 4 is a characteristic diagram for explaining the operation of the embodiment shown in FIG. 3.

The operation of the embodiment including the bias-up circuit 163 will now be described. The rectangular wave generated from the transistor 75 in response to the AC output of the alternator 150, is applied to the frequency-to-current conversion circuit 165 in the bias-up circuit 163. The frequency-to-current conversion circuit 165 generates constant currents $i_1$ and $i_2$ from its transistors 96 and 97, respectively. When the transistor 75 is turned off, the transistors 92 and 95 are turned on so that the constant current $i_1$ flows through the transistor 92 and the constant current $i_2$ flows through the transistor 95. On the other hand, when the transistor 75 is turned on, the transistors 92, 93 and 95 are turned off so that the constant current $i_2$ flows through the diode 118 and the constant current $i_2$ charges the capacitor 143. When the capacitor 143 is charged, the emitter potential of the transistor 94 increases so that in comparison with the base potential of the transistor 94 determined by the resistors 48 and 49, the transistor 94 is turned on at a predetermined emitter potential and the transistor 93 is also turned on, thus causing the constant current $i_1$ to flow through the transistor 93. In this case, since the charging time of the capacitor 143 is determined by the time constant, the amount of current that flows through the diode 118 during the charging time is proportional to the frequency. When the capacitor 142 is charged by this current, the base potential of the transistor 87 becomes proportional to the frequency and the output of the transistor 85 is made through the transistor 86 proportional to the frequency or the engine speed. This output is charged by the function circuit 166 into a form having a nonlinear relation to the engine speed N, that is, the rate of change is small at low engine speeds and the rate increases with an increasing speed as shown by $V_u$ in FIG. 4 and it is applied as a bias to the base of the transistor 71 through the diode 111. Also the output of the transistor 88 is proportional to the frequency and it is changed by the function circuit 167 into a form having a nonlinear relation to the engine speed N in that its rate of change is small at low engine speeds and the rate increases with an increase in the engine speed. When the output circuit 162 is not controlled by the constant-current control circuit 161, the transistor 78 is turned off and the transistor 91 is turned on. Consequently, the output of the transistor 88 flows through the transistor 91 and the bias is not changed. On the other hand, when the power transistor 100 of the output circuit 162 is subjected to the constant-current control by the constant-current control circuit 161, the transistor 78 is turned on and the transistor 91 is turned off, thus causing the output of the transistor 88 to flow through the transistor 90. Since the transistors 89 and 90 form a current Miller circuit, the transistor 89 is turned on so that the base potential of the transistor 87 is decreased nonlinearly to the change of the number of revolutions of the engine and the bias is decreased from the $V_u$ shown in FIG. 4 by an amount corresponding to $V_d$. The amount $V_d$ is varied in accordance with the length of a time that the power transistor 100 is subjected to the constant-current control and consequently the bias applied to the voltage comparison circuit 160 is varied with the engine speed N as shown by the curve m shown in FIG. 4.

The operation of the function circuits 166 and 167 will now be described by taking the case of the function circuit 166. If the resistance values of the resistors 38, 39 and 40 are selected to be successively smaller in this order, when the capacitor voltage is low, a current flows through the resistors 38, 39, 40 and 37. When the voltage is increased, the diode 112 becomes conductive so that the current flows through the diode 112 and the resistors 39, 40 and 37 and the amount of current flow increases. When the voltage is increased further so that the diode 113 also becomes conductive, the current flows through the diodes 112 and 113 and the resistors 40 and 37 and the amount of current flow is increased further. When the voltage is increased still further so that eventually the diode 114 is also rendered conductive, the current flows through the diodes 112, 113 and 114 and the resistor 37 and the amount of current flow is increased further. In this way, the current flow has a nonlinear relation to the capacitor voltage and the optimum closing angle control is accomplished.

While, in the embodiment described above, the function circuits are each comprised of resistors and diodes, any other arrangement may be used provided that the similar characteristic is provided. Further, where an alternator having a different Ac output waveform is used, it is only necessary to use function circuits having bias-number of revolutions characteristics which ensure the optimum closing angle control with respect to the waveform. Still further, while each of the bias-up circuit and the bias-down circuit includes the function circuit in the output section, the better characteristic than the known construction can still be obtained even if the function circuit of the bias-down circut is eliminated.

We claim:

1. A contactless ignition system for internal combustion engines comprising:
   an alternator operated in synchronism with rotation of an engine to generate an AC output;
   a bias-up circuit disposed to generate a DC output which increases nonlinearly in accordance with the number of revolutions of said engine in such a manner that the change of said DC output is small when said rotational speed is low but increases with an increase in said rotational speed; and
   a voltage comparison circuit disposed to receive a bias changing in accordance with the DC output of said bias-up circuit and respond to said bias and the AC output of said alternator to generate a rectangular wave output for determining making and breaking of a primary current in an ignition coil,
   wherein said voltage comparison circuit applies to said bias-up circuit a signal corresponding to the AC output of said alternator and having the same frequency therewith, and wherein said bias-up circuit comprises a circuit responsive to said signal having the same frequency as the frequency of said AC output to generate an output of a magnitude proportional to the speed of said engine, and a function circuit response to said output proportional to engine speed to generate said DC output whose change is small when the speed of said engine is low but increases with an increase in engine speed.

2. A contactless ignition system for internal combustion engines comprising:
   an alternator operated in synchronism with rotation of an engine to generate an AC output;
   a bias-up circuit disposed to generate a DC output which increases nonlinearly in accordance with the number of revolutions of said engine in such a manner that the change of said DC output is small when the speed of said engine is low but increases with an increase in said engine speed;
   a voltage comparison circuit disposed to receive a bias varying in accordance with the DC output of said bias-up circuit and respond to said bias and the AC output of said alternator to generate a rectangular wave output for determining making and breaking of a primary current in an ignition coil;
   a constant-current control circuit whereby a power transistor of an output circuit is subjected to constant-current control so as to limit the primary current in said ignition coil to a value below a predetermined value; and
   a bias-down circuit for decreasing the DC output of said bias-up circuit in accordance with the speed of said engine during a time that said power transistor is subjected to said constant-current control;
   wherein the rate of decrease in the DC output of said bias-up circut effected by said bias down-circuit is increased nonlinearly in such a manner that the variation of said DC output is small when the speed of said engine is low but increases with an increase in said engine speed.

3. A system as set forth in claim 2, wherein said voltage comparison circuit applied to said bias-up circuit a signal corresponding to the AC output of said alternator and having the same frequency as the frequency of said AC output, and wherein said bias-up circuit comprises a circuit responsive to said signal having the same frequency as said Ac output to generate an output having a magnitude proportional to the speed of said engine, and a first function circuit responsive to said output proportional to engine speed to generate said DC output whose change is small when the speed of said engine is low but increases with an increase in said engine speed.

4. A system as set forth in claim 3, wherein said bias down-circuit comprises a signal generating circuit including a second function circuit and disposed to receive and respond to said signal from said bias-up circuit having a magnitude proportional to the number of revolutions of said engine to generate a signal whose change is small when the speed of said engine is low but increases with an increase in said engine speed, and a circuit responsive to a signal from said constant-current control circuit indicating that said constant-current control is being effected so as to apply to said bias-up circuit a signal proportional to the output of said signal generating circuit, wherein said output of said bias-up circuit having a magnitude proportional to the number of revolutions of engine is decreased in response to the signal from said bias-down circuit.

* * * * *